United States Patent
Roux

(10) Patent No.: US 9,936,466 B1
(45) Date of Patent: Apr. 3, 2018

(54) BLUETOOTH LOW ENERGY COLLISION MANAGEMENT

(71) Applicant: Conduent Business Services, LLC, Dallas, TX (US)

(72) Inventor: Pascal Roux, Chabeuil (FR)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 15/436,227

(22) Filed: Feb. 17, 2017

(51) Int. Cl.
*H04B 7/00* (2006.01)
*H04W 52/36* (2009.01)
*H04W 4/00* (2018.01)
*H04W 28/04* (2009.01)

(52) U.S. Cl.
CPC ........... *H04W 52/36* (2013.01); *H04W 4/008* (2013.01); *H04W 28/044* (2013.01)

(58) Field of Classification Search
CPC .... H04W 52/36; H04W 4/008; H04W 28/044
See application file for complete search history.

(56) References Cited

U.S. PATENT DOCUMENTS

| | | |
|---|---|---|
| 6,671,737 B1 | 12/2003 | Snowdon et al. |
| 6,708,142 B1 | 3/2004 | Baillot et al. |
| 9,433,031 B2 | 8/2016 | Hiramatsu |
| 9,444,522 B2 | 9/2016 | Yang et al. |
| 9,460,433 B2 | 10/2016 | Proctor, Jr. et al. |
| 9,507,015 B2 | 11/2016 | Krishnakumar et al. |
| 9,521,648 B1 | 12/2016 | Kolekar et al. |
| 2007/0264929 A1* | 11/2007 | Chen ................. H04B 7/18515 455/1 |
| 2009/0283591 A1 | 11/2009 | Silbernagl |
| 2010/0008313 A1 | 1/2010 | McHenry et al. |
| 2012/0234914 A1 | 9/2012 | Roux |
| 2014/0201066 A1 | 7/2014 | Roux et al. |
| 2015/0372720 A1 | 12/2015 | Shimshoni |
| 2016/0124573 A1 | 5/2016 | Rouaissia et al. |
| 2016/0156386 A1 | 6/2016 | Van Nieuwenhuyze et al. |
| 2016/0189461 A1 | 6/2016 | Kanon et al. |
| 2016/0254589 A1 | 9/2016 | Ju et al. |
| 2016/0261973 A1 | 9/2016 | Socol et al. |

(Continued)

OTHER PUBLICATIONS

Trafton, A., New cheap NFC sensor can transmit information on hazardous chemicals, food spoilage to smartphone, Phys. Org. Dec. 8, 2014, 3 pages.

(Continued)

*Primary Examiner* — Mohammed Rachedine
(74) *Attorney, Agent, or Firm* — Kermit D. Lopez; Luis M. Ortiz; Ortiz & Lopez, PLLC

(57) ABSTRACT

Methods and systems are disclosed for managing the emission of data from RF enabled tags. In an example embodiment, data is emitted from a tag via RF communications. An operation can be implemented to detect one or more non-official applications running on a mobile device (e.g., a nearby mobile device). The emission power level for emitting such data can then be automatically varied until an answer is received from an official application running on another mobile device so as to prevent said mobile device running said non-official application from preventing said official application running on said another mobile device from completing a transaction with respect to said data emitted from said tag via said RF communications.

20 Claims, 8 Drawing Sheets

(56) References Cited

U.S. PATENT DOCUMENTS

2016/0275648 A1    9/2016  Honda et al.
2016/0342821 A1   11/2016  Nyalamadugu et al.
2017/0126262 A1*   5/2017  Zakaria ................ H04B 1/1036

OTHER PUBLICATIONS

Shockley, J. A., Ground Vehicle Navigation Using Magnetic Field Variation, Dissertation, Air Force Institute of Technology, Wright-Patterson Air Force Base, Ohio, Sep. 2012, 186 pages.
Subbu, K. P. et al., LocateMe: Magnetic-Fields-Based Indoor Localization Using Smartphones, ACM Transactions on Intelligent Systems and Technology (2013) 4(4), Article 73, 28 pages.
Burkard, S., Near Field Communication in Smartphones (2012) https://www.snet.tu-berlin.de/fileadmin/fg220/courses/WS1112/snet-project/nfc-in-smartphones_burkard.pdf, 10 pages.
Michel, T. et al., On Attitude Estimation with Smartphones, accepted for the International Conference on Pervasive Computing and Communications (PerCom 2017).. 2016. <hal-01376745> 11 pages.

* cited by examiner

BLUETOOTH LOW ENERGY COLLISION MANAGEMENT

TECHNICAL FIELD

Embodiments are generally related to BLE (Bluetooth Low Energy) devices, methods, and systems. Embodiments also relate to mobile devices, such as smartphones, tablet-computing devices, and wearable computing devices and so on, which utilize BLE forms of communication. Embodiments further relate to tags installed on vehicles or gates that allow for transactions with mobile devices.

BACKGROUND

Ticketing is an essential function in public transportation networks. A ticketing function must successfully address several key requirements from both the travelers and the operator's perspectives. Typical traveler requirements may include ease of use (easy to learn and routine in practice), clear and visible pricing, secure with respect to loss, theft or forgery, e.g., ticket books, passes, etc., and privacy preserving. Typical operator requirements of a ticketing function may include user acceptance (barriers to usage can quickly lead to a rejection of the transportation system by the public), security (confidentiality of the transaction, authentication and non-repudiation, fraud resistance (amateur and organized)), and high availability. Additional requirements of the operator to ticketing functions will correspond to deployment costs, both for infrastructure (readers, validation systems, personnel, etc.) and mobility (tickets, cards, etc., in the hands of the traveler).

Tags may be employed in such ticketing applications. An example of a tag is disclosed in U.S. Patent Application Publication No. 2014/0201066 to Pascal Roux et al., which published on Jul. 17, 2014 and is incorporated herein by reference in its entirety. In particular, BLE tags may be utilized for transactions such as ticketing or other activities. Any BLE mobile device (e.g., a smartphone) may answer to a BLE tag, which may prevent the desired mobile device in front of such a tag from making a BLE transaction (e.g., a ticketing or other transaction or activity). The tag power may be reduced to limit this risk. However, a minimum level must be kept to guarantee proper operation with any smartphone (and housing) having any sensitivity. The problem may still occur with unwanted smartphones in some proximity of the tag.

BRIEF SUMMARY

The following summary is provided to facilitate an understanding of, some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide improved RF (Radio Frequency) enabled tags that are capable of being installed on or in for example, vehicles or gates, and which allow for transactions with mobile devices.

It is another aspect of the disclosed embodiments to provide for devices, methods, and systems for managing the emission of data from such RF enabled tags for receipt by nearby mobile devices.

It is another aspect of the disclosed embodiments to provide for devices, methods, and systems for successively using varying power levels in order to automatically and quickly find a power level which allows a communication only with the closest mobile device (i.e., the one willing to make a transaction with respect to the tag).

The aforementioned aspects and other objectives and advantages can now be achieved as described herein. A method, apparatus, and system are disclosed for managing the emission of data (e.g., advertisements, messages, etc.) from RF enabled tags. In an example embodiment, data is emitted from a tag via RF communications. An operation can be implemented to detect one or more non-official applications running on a mobile device (e.g., one or more nearby mobile devices). The emission power level for emitting such data can then be automatically varied until an answer is received from an official application running on another mobile device so as to prevent said mobile device running said non-official application from preventing said official application running on said another mobile device from completing a transaction with respect to said data emitted from said tag via said RF communications. The emission power level can be varied utilizing, for example, a decreasing ramp algorithm or a dichotomy algorithm.

The disclosed approach is based on the fact that a mobile device such as a smartphone may be equipped with a non-official application and the user of such a smartphone may decide to always answer tag emitted data such as advertisements, which can prevent other mobile devices (equipped with an "official" application) from completing a transaction even though such devices may be located directly in front of the tag.

The disclosed embodiments can therefore emit data from a tag with different power levels in order to automatically and quickly find the power level that allows for a transaction with the closest mobile device (i.e., the mobile device willing to make an "official" transaction). The tag can be equipped with instructions that instruct the tag to detect non-official applications that continuously answer and prevent other official applications from answering, and additionally with instructions that change the power level (e.g., by using a decreasing ramp or a dichotomy algorithm) until it (the tag) receives an answer from another official application.

BRIEF DESCRIPTION OF THE DRAWINGS

The accompanying figures, irk which like reference numerals refer to identical or functionally similar elements throughout the separate views and which are incorporated in and form a part of the specification, further illustrate the present invention and, together with the detailed description of the invention, serve to explain the principles of the disclosed embodiments.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Additionally, the term "step" can be utilized interchangeably with "instruction" or "operation".

Figure 1:
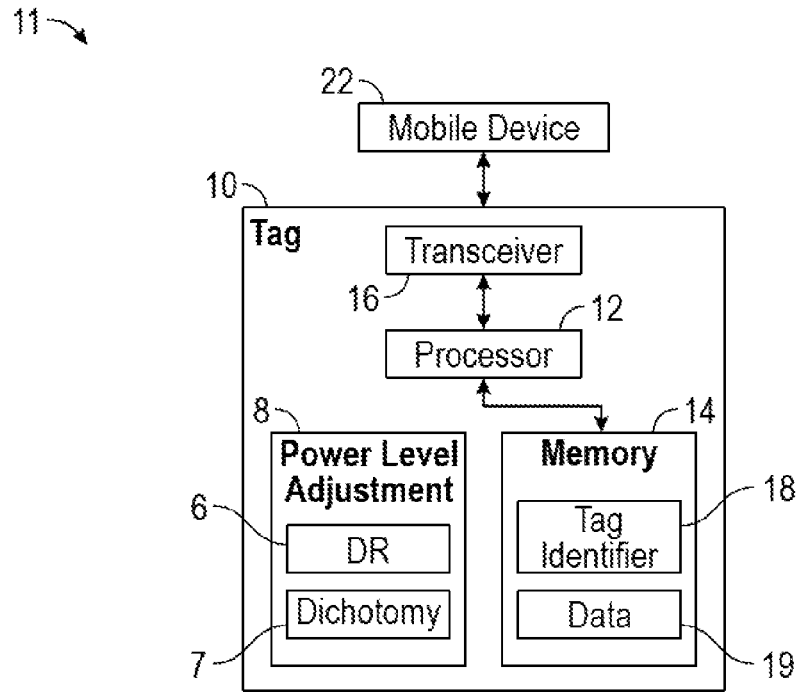
FIG. 1 illustrates a block diagram depicting a system for using a plurality of power levels in order to automatically and rapidly find the power level, which allows a communication only with the closest mobile device willing to make a transaction, in accordance with an example embodiment.

FIG. 1 illustrates a block diagram depicting a system 11 for using a plurality of power levels in order to automatically and rapidly find the power level, which allows a communication only with the closest mobile device 22 (willing to make a transaction), in accordance with an example embodiment. The system 11 shown in FIG. 1 includes a tag 10 that is associated with and/or includes a power level adjustment module 8. The tag 10 can adjust the power level (from a set of at least two different power levels) of the transceiver 16 and then send data (e.g., advertisements, messages, etc.) and wait for a response from, for example, the mobile device 22.

The tag 10 can be implemented in the context of a wireless system for enabling transactions on an associated network delivering services (e.g., advertisements, data, etc.) to end users in accordance with one aspect of an exemplary embodiment. The tag 10 is a BLE enabled tag and thus can communicate via its transceiver 16 with BLE enabled devices, such as, for example, the mobile device 22. Note that the term "tag" as utilized herein can include any kind of device that is non-battery operated (e.g., a non-battery operated device connected to a power supply). The term "tag" as utilized herein can also refer to any kind of device that is battery operated.

The example embodiments shown in FIG. 1 allow for the emission of data from the tag 10 with different power levels in order to automatically and quickly determine a power level for receipt of data by mobile device 22. This allows for a transaction with the closest mobile device (the device willing to make an official transaction), such as, for example, mobile device 22. In the example shown in FIG. 1, it can be assumed that mobile device 22 is running an "official" application (which will be discussed in more detail herein), and that this is the device that actually should be receiving the data (e.g., advertisements, messages, etc.) emitted from the tag 10 via transceiver 16.

The tag 0 includes a power level adjustment module 8, which can be configured to detect "non-official" applications (which will be discussed in more detail herein) that continuously answer and prevent other applications to answer and/or change the emission power level by using, for example, a DR (Decreasing Ramp) module 6 or a dichotomy module 7 until the tag 10 receives an answer from another application. The DR module 6 can provide instructions for implementing a DR algorithm, and the dichotomy module 7 can provide instructions for implementing a dichotomy algorithm. The power level adjustment module 8 may be implemented as a module that communicates with the memory 14 of the tag 10. As will be discussed shortly, the power level adjustment module 8 can be implemented as a hardware module, a software module, and/or a combination of both hardware and software.

Figure 2:
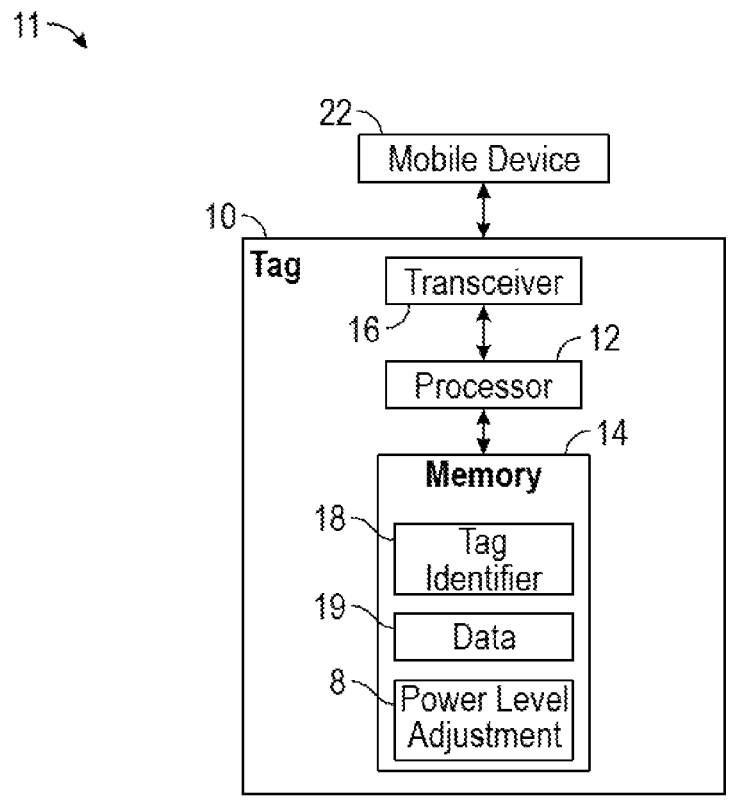
FIG. 2 illustrates a block diagram depicting a system for using a plurality of power levels in order to automatically and rapidly find the power level, which allows a communication only with the closest mobile device willing to make a transaction, in accordance with an alternative example embodiment.

FIG. 2 illustrates a block diagram depicting a system 11 that utilizes a plurality of power levels to automatically and rapidly determine the power level, which allows a communication only with the closest mobile device willing to make a transaction, in accordance with an alternative example embodiment. Note that in FIGS. 1-2, identical or similar parts are indicated by identical reference numerals. The example embodiment shown in FIG. 2 is an alternative version of the example embodiment depicted in FIG. 1.

Although not shown in FIG. 2, the power level adjustment module 8 depicted in FIG. 2 can include the DR module 6 and/or the dichotomy module 7 shown in FIG. 1. The DR module 6 and the dichotomy module 7 will be discussed in greater detail herein with respect to FIGS. 4-5.

Note that in most instances, a "module" can constitute a software application, but can also be implemented as both software and hardware (i.e., a combination of software and hardware). Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

The term module as utilized herein may refer to a collection of routines and data structures that perform a particular task or implements a particular data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. A module may also refer to a hardware component that is equipped with software (e.g., software module or modules). Thus, the power level adjustment module 8 depicted in FIGS. 1-2 and FIGS. 4-5 herein can include modules (or sub-modules) such as the DR module 6 and/or the dichotomy module 7.

One or more tags such as tag 10 can be implemented as a deployed service access point to the associated network, such as entrances, exits, vehicles, stops, barriers, parking lot gates, etc., each tag having a unique identifier, an irreversible counter, a master key, and a log of previous transactions. The tag need not be connected to any network, thus allowing the positioning of the tag on a variety of service access points, e.g., on vehicles of a transportation system, on entrances to venues, gates to parking lots, etc.

The tag 10 can be powered (e.g., self-contained power supply, not shown). The tag 10 includes a processor 12 in communication with memory 14 and a transceiver 16. The processor 12 may include a random number generator and other suitable components to facilitate the systems and methods discussed hereinafter. The memory 14 may comprise non-volatile and/or volatile memory capable of storing various types of data. The tag 10 may utilize symmetric cryptography (3DES, AES, etc.) or asymmetric cryptography (RSA, ECC, etc.). The memory 14 may include, for example, data 19 and a unique tag identifier (TagID) 18 associated with the tag 10 and which can be supplied by a central system during deployment of the tag 10. The transceiver 16 of the tag 10 may correspond to any suitable component capable of establishing bi-directional communication between the tag 10 and user devices such as, for example, mobile device 22 and/or other devices, such as a controller device (not shown).

In some example embodiments, the tag 10 may incorporate a low-cost Near Field Communication (NFC) small component, which is powered or unpowered, which is also capable of communication with an NFC-enabled user device over a short distance (e.g., up to 10 cm), and which can be affixed to a vehicle, station, turnstile, gate, barrier or other accoutrement associated with systems and networks delivering services, as illustrated and discussed in further detail herein. It should be appreciated, however, that the targeted usage of the disclosed power level adjustment module 8 is primarily the case where BLE is used instead of NFC, because with NFC, the phone can only interrogate the tag at a very short distance and no collision is possible. With BLE, on the other hand, the phone will answer to an advertisement actively emitted by the tag. In addition, the phone should be close enough to guarantee a conscious act from its owner (this close distance may be verified by the tag using the RSSI (Received Signal Strength Indication)).

The terms "user device" or "mobile device" can be utilized interchangeably with one another and denotes a device owned by the user and able to contain and/or process an "application" for interacting with the network delivering services to users. Examples of such a user device include, without limitation, mobile phones, personal data assistants, tablets, and other personal electronic devices. The user device or mobile device 22 may be NFC enabled and/or Bluetooth enabled (e.g., a BLE (Bluetooth Low Energy) enabled device) as well as capable of data communication with one or more wired or wireless networks, as discussed in greater detail herein. In some example embodiments, a user device or mobile device may be, for example, a computing device such as a wearable computing device (e.g., a smartwatch).

It can be appreciated that tags such as tag 10 may be located or placed in a variety of locations and on board vehicles such as, for example, a public transportation vehicle (e.g., a sub, tramway, metro, train, taxis, etc.) or a private commercial transportation vehicle (e.g., an Uber, Lyft, etc.).

Figure 3:
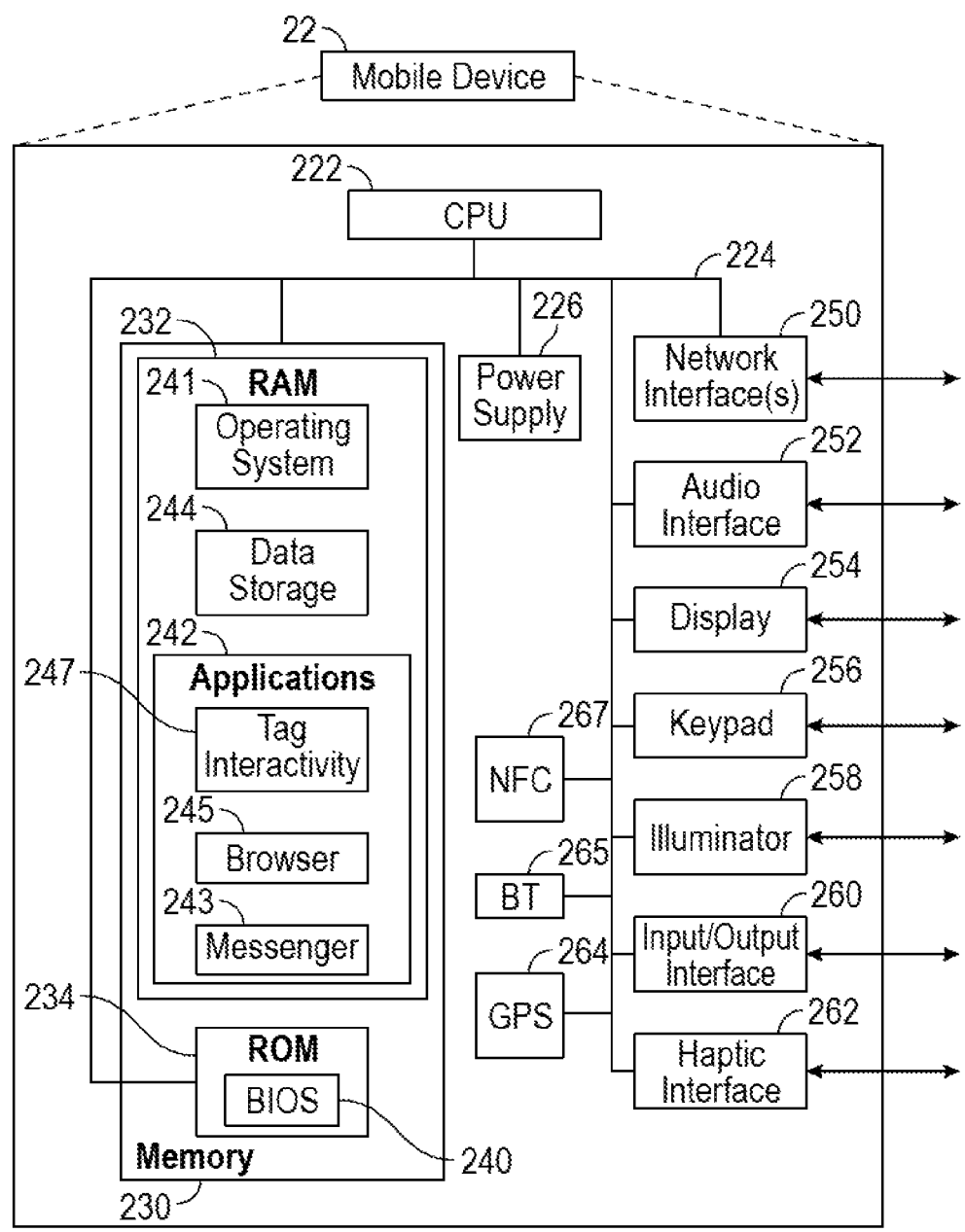
FIG. 3 illustrates a schematic diagram depicting one example embodiment of a mobile device that can be utilized in accordance with an example embodiment.

FIG. 3 illustrates a schematic diagram depicting one example embodiment of the mobile device 22 (e.g., a client device) depicted in FIGS. 1-2 and FIGS. 4-5, in accordance with an example embodiment. The mobile device 22 can function as a computing device capable of sending or receiving signals through a wired or a wireless network such as, for example, wireless network 110 depicted in FIG. 4.

The mobile device 22 may be implemented as, for example, a desktop computer or a portable device, such as a cellular telephone, a Smartphone, a display pager, a radio frequency (RF) device, an infrared (IR) device, a Personal Digital Assistant (PDA), a handheld computer, a tablet computer, a laptop computer, a wearable computer, or an integrated device combining various features, such as features of the foregoing devices, or the like. In a preferred example embodiment, however, it can be assumed that the mobile device 22 is a mobile device such as, for example, a smartphone, tablet computing device, a smartwatch, or other wearable computing devices.

A client device such as mobile device 22 may vary in terms of capabilities or features. The claimed subject matter is intended to cover a wide range of potential variations. For example, a cell phone may include a numeric keypad or a display of limited functionality, such as a monochrome liquid crystal display (LCD) for rendering text and other media. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

A client device such as mobile device 22 may include or may execute a variety of operating systems, such as operating system 241, including in some example embodiments, a personal computer operating system, such as a Windows®, iOS®, or Linux®, or a mobile operating system, such as iOS®, Android®, or Windows Mobile®, or the like. A client device such as mobile device 22 may include or may execute a variety of possible applications, such as a client software application enabling communication with other devices, such as communicating one or more messages, such as via email, short message service (SMS), or multimedia message service (MMS), including via a network, such as an online social network, including, for example, Facebook®, LinkedIn®, Twitter®, Flickr®, Google+®, to provide only a few possible examples.

A client device, such as mobile device 22, may also include or execute an application to communicate content, such as, for example, textual content, multimedia content, or the like. A client device may also include or execute an application to perform a variety of possible tasks, such as browsing, searching, playing various forms of content, including locally stored or streamed video, or games (e.g., fantasy sports leagues, etc.). The foregoing is provided to illustrate that claimed subject matter is intended to include a wide range of possible features or capabilities. Examples of such applications (or modules) can include a messenger 243, a browser 245, and other client application(s) or module(s) such as a tag module 247 that provides instructions for facilitating interactivity and communications between the mobile device 22 and the tag 10.

The example mobile device 22 shown in FIG. 3 generally includes a CPU (Central Processing Unit) 222 and/or other processors (not shown) coupled electronically via a system bus 224 to memory 230, power supply 226, and a network interface 250. The memory 230 can be composed of RAM (Random Access Memory) 232 and ROM (Read Only Memory) 234. Other example components that may be included with mobile device 22 can include, for example, an audio interface 252, a display 254, a keypad 256, an illuminator 258, and an input/output interface 260. In some example embodiments, a haptic interface 262 and a GPS (Global Positioning System) module or unit 264 along with a Bluetooth (BT) module 265 and an NFC (Near Field Communications) module 267 can also be electronically coupled via the system bus 224 to CPU 222, memory 230, power supply 226, and so on.

The BT (Bluetooth) module 265 can permit communication of mobile device 22 with other devices, including Bluetooth and/or BLE beacons and/or transponders as discussed herein. The near field communication (NEC) module 267 can facilitate NEC communication with other devices including, e.g., an NEC beacon. With respect to the Bluetooth module 265, it may be implemented as a Bluetooth Low Energy (BLE) module and/or a Bluetooth 4.0 module that implements communications using one or more of BLE systems, standard Bluetooth systems, and/or iBeacon systems specifically. As understood herein, BLE may operate in the same spectrum range (the 2.400 GHz-2.4835 GHz band) as classic Bluetooth technology, but may use a different set of channels. Instead of Bluetooth's seventy nine 1-MHz channels, e.g., BLE employs forty 2-MHz channels. BLE may send data within a channel using Gaussian frequency shift modulation with a one megabyte per second data rate and a maximum transmission power of ten milliwatts (10 mW).

RAM 232 can store an operating system 241, provide for data storage 244, and the storage of applications 242 such as, for example, browser 245 and messenger 243 applications. ROM 234 can include a BIOS (Basic Input/Output System) 240, which is a program that the CPU 222 utilizes to initiate the computing system associated with mobile device 22. BIOS 240 can also manage data flow between operating system 241 and components such as display 254, keypad 256, and so on.

Applications 242 can thus be stored in memory 230 and may be "loaded" (i.e., transferred from, for example, memory 230 or another memory location) for execution by the mobile device 22. Mobile device 22 can receive user commands and data through, for example, the input/output interface 260. The mobile device 22 in accordance with instructions from operating system 241 and/or application(s) 242 may then act upon such inputs. The interface 260, in some embodiments, can serve to display results, whereupon a user may supply additional inputs or terminate a session. The software application(s) 242 can include one or more modules such as modules 243, 245, 247, and so on, which can, for example, implement instructions or operations such as those described herein.

Figure 4:
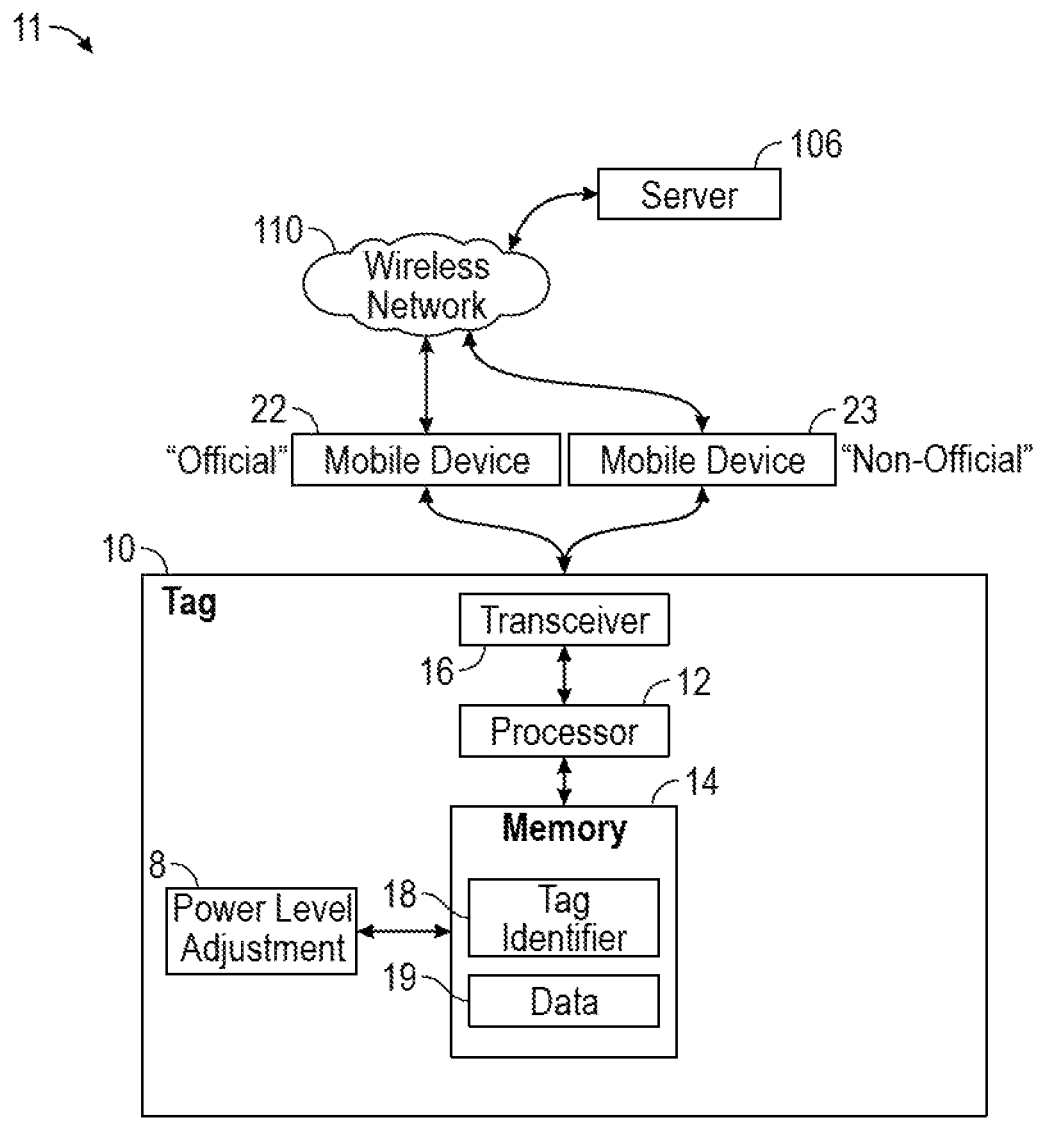
FIG. 4 illustrates a system for improving BLE collision management, in accordance with an example embodiment.

FIG. 4 illustrates a system 11 for improving BLE collision management, in accordance with an example embodiment. Note that in FIGS. 1-5 herein, similar or identical parts or elements are indicated by identical reference numerals. System 11 shown in FIG. 4 is an alternative version of the system 11 embodiments depicted in FIGS. 1-2. As shown in FIG. 4, the mobile device 22 can communicate with a wireless network 110 via packet data communications. Another mobile device(s) 23 can also communicate with the wireless network 110. Note that the mobile device(s) 23 may be a device that is similar to the mobile device 22 shown in FIG. 3, but may vary in the type of device (e.g., a iPhone versus an Android-based smartphone or a smartphone versus a table computing device, etc.).

As indicated previously, the tag 10 may be located on or incorporated into a vehicle such as an automobile or public transportation vehicle (e.g., a city bus, a subway car, etc.) and can include the power level adjustment module 8 as discussed previously. The tag 10 can be implemented as a Bluetooth-enabled tag used in, for example, public transport vehicles (e.g., buses, subways, trams, etc.) to enable travel validation with mobile phones such as the mobile device 22 depicted in the various preferred and alternative embodiments shown in FIGS. 1-2 and FIGS. 4-5.

As indicated previously, the power level adjustment module 8 can include the DR (Decreasing Ramp) module 6 and/or the dichotomy module 7. The DR module 6 maintains instructions for a decreasing ramp algorithm and the dichotomy module 7 maintains instructions for a dichotomy algorithm.

With the decreasing ramp algorithm employed by the DR module 6, the power level can be decreased step-by-step from a maximum or "standard" level down to a level where, for example, the mobile device(s) 23 does not answer anymore. The step value may be constant (e.g., in milliwatts) giving an arithmetic progression of the power level, or in decibels, and in this case providing a geometric progression of the power level, or may not be constant (e.g., based on previous experience) (e.g., using previous levels which succeeded in rejecting the mobile device(s) 23 while still communicating with the mobile device 22).

With the dichotomy algorithm provided by the dichotomy module 7, at each step the power level can be set to a value between the last known level where the mobile device(s) 23 still answers and the last known level where no phone answers (starting from the minimum achievable power level). The computation of the value may use arithmetic average, geometric average, harmonic average, or any other formula (e.g., based on previous experience) (e.g., using previous levels which succeeded in rejecting the mobile device(s) 23 while still communicating with the mobile device 22).

The wireless network 110 shown in FIG. 4 can be implemented as a packet-based wireless network that communicates via packet based wireless data communications with the mobile device 22 and/or the mobile device(s) 23. The wireless network 110 may be, for example, a WAN (Wide Area Network)/LAN (Local Area Network), a WiFi network, a cellular communications network, and so on. The wireless network 110 may further communicate with a server 106, which can contain memory and processor components, and which can store and process operations such as described herein.

System 11 can thus manage the emission of data (e.g., advertisements, messages, etc.) from the BLE enabled tag 10. Data is emitted from the tag 10 via RF communications (e.g., such as BLE communications). An operation can be implemented to detect one or more non-official applications running on a mobile device (e.g., one or more nearby mobile devices) such as, for example, mobile device(s) 23. In the scenario shown in FIG. 4, it can be assumed that mobile device(s) 23 is running a non-official application and mobile device 22 is running the official application. The emission power level for emitting data from tag 10 can be automatically varied until an answer is received from an official application running the mobile device 22 so as to prevent said mobile device(s) 23 running said non-official application from beginning or completing a transaction with respect to said data emitted from said tag 10. The emission power level associated with the emission of data from the tag 10 can be varied utilizing, for example, the decreasing ramp algorithm employed by the decreasing ramp module 6 or the dichotomy algorithm provided by the dichotomy module 7 shown, for example, in FIG. 1.

Regarding non-official and official applications, there are two types of non-official applications. The first type (Type 1 Application) of non-official application involves an application that is configured or made by modifying an official application to "look like" an official application, and which may also be able to "complete a transaction" (depending on the expiry date of its keys or any other fraud detection mechanism available in, for example, the tag 10). The second type (Type 2 Application) of non-official application involves an application that is "made from scratch" and which "only" (but always) answers the data (e.g., advertisements, messages, etc.) emitted from a tag such as tag 10.

The tag has to reject both types of applications and can therefore (according to the disclosed embodiments) detect for Type 1 Applications, that a transaction has already completed and that the Type 1 Application should not continuously answer to, for example, advertisement messages and try to make a transaction; and for Type 2 Applications, that a transaction is not possible because the application does not continue with an official sequence of messages after its answer to an advertisement message. Therefore, the emission power level can be automatically varied so as to prevent mobile device(s) 23 from "occupying the communication channel" (and not "completing a transaction").

In some example embodiments, the server 106 may function as a content server that is configured to provide content via a network (e.g., a client/server network) to other networks and devices. A content server may, for example, host a site, such as a social networking site, examples of which may include, without limitation, Flickr®, Twitter®, Facebook®, LinkedIn®, or a personal user site (e.g., such as a bldg, vlog, online dating site, etc.). A content server may also host a variety of other sites, including but not limited to, business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type, or programmable consumer electronics, etc.

The wireless network 110 can couple devices so that communications may be exchanged, such as between the server 106 and the mobile device 22 or other types of devices, including between wireless devices coupled via a wireless network, for example. The wireless network 110 may also include mass storage, such as network-attached storage (NAS), a storage area network (SAN), or other forms of computer or machine-readable media, for example. A network may include the Internet, one or more Local Area Networks (LANs), one or more Wide Area Networks (WANs), wire-line type connections, wireless type connections, or any combination thereof. Likewise, sub-networks may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

The wireless network 110 depicted in FIG. 4 may couple client devices with the network. That is, such a wireless network may employ stand-alone ad-hoc networks, mesh networks, wireless LAN (WLAN) networks, cellular networks, or the like. A wireless network such as wireless network 110 can further include a system of terminals, gateways, routers, or the like coupled by wireless radio links, or the like, which may move freely, randomly, or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Note that signal packets communicated via a network, such as a network of participating digital communication networks (e.g., wireless network 110) may be compatible with or compliant with one or more protocols. Signaling formats or protocols employed may include, for example, TCP/IP, UDP, DECnet, NetBEUI, IPX, AppleTalk, or the like. Versions of the Internet Protocol (IP) may include IPv4 or IPv6.

The Internet refers to a decentralized global network of networks. The Internet includes Local Area Networks (LANs), Wide Area Networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc., that may route the signal packet in accordance with a target address and availability of a network path to the target address.

Figure 5:
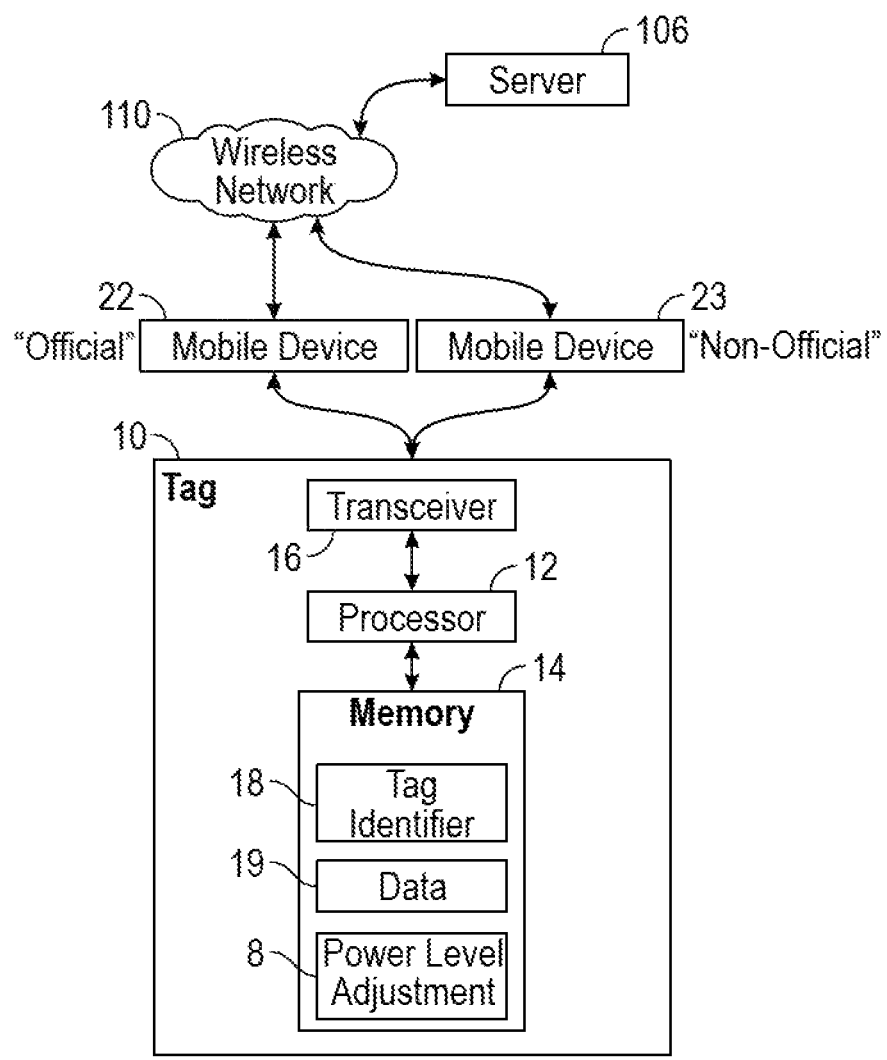
FIG. 5 illustrates a system for improving BLE collision management, in accordance with an alternative example embodiment.

FIG. 5 illustrates a system 11 for improving BLE collision management, in accordance with an alternative example embodiment. It can be appreciated that like the embodiment shown in FIG. 2, the system 11 can be implemented with the power level adjustment module 8 and its sub-modules stored in memory 14 and then processed by the processor 12. Thus, in the example embodiment depicted in FIG. 5, the power level adjustment module 8 is depicted as being maintained by the memory 14. In such a situation, it can be assumed that the power level adjustment module 8 is a software module or primarily a software module, whereas in the example embodiment depicted in FIG. 4, the module 8 may be implemented as hardware, software, and/or a combination of software/hardware, depending on design considerations.

Figure 6:
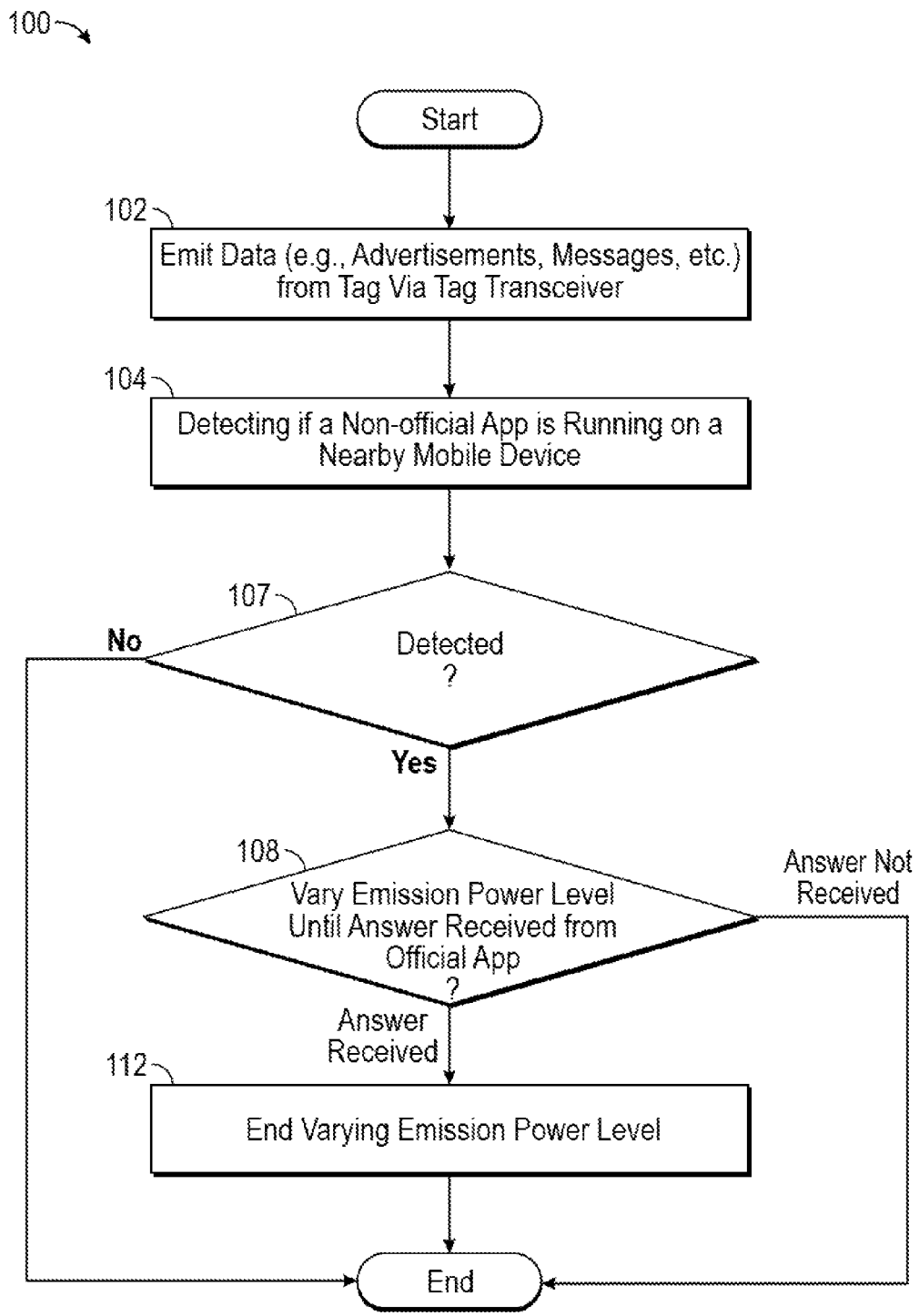
FIG. 6 illustrates a flow chart of operations depicting logical operational steps of a method for BLE collision management, in accordance with an example embodiment.

FIG. 6 illustrates a flow chart of operations depicting logical operational steps of a method 100 for BLE collision management, in accordance with an example embodiment. The method 100 depicted in FIG. 6 generally manages the emission (RF transmission) of data (e.g., messages, advertisements, etc.) from a tag such as tag 10. As indicated at block 102, a step or operation can be implemented for emitting data from a tag (e.g., tag 10) via RF communications (e.g., BLE communications) via the tag's transceiver (e.g., transceiver 16). Thereafter, as shown at block 104, a step or operation can be implemented for detecting if a non-official application ("app") is running on a first mobile device (e.g., such as the mobile device(s) 23). If such a non-official app is detected as shown at decision block 107, then as indicated thereafter at decision block 108, a step or operation can be performed for varying the emission power level for emitting the data from the tag via the aforementioned RF communications until an answer is received from an official app running on another mobile device so as to prevent the first mobile device running said non-official app from preventing said official application running on said another mobile device from initiating or completing a transaction with respect to said data emitted from said tag via said RE communications. Following processing of the operation depicted at block 112, varying of the emission power level can then end. Thus, as shown in FIG. 6, the variation of the power level occurs until an official answer is received.

Note that the method 100 of reducing emission power level to avoid detection by unwanted mobile devices in some instances lead to more communication errors such as the signal-to-noise ratio being reduced by the power level reduction. Therefore, the method 100 and the various other features discussed herein can be expanded and modified such that as soon as another "app" is detected (e.g., in response to the advertisement message), the tag power level may be increased when sending messages addressed to this particular application, in order to limit the risk of communication errors (because the ambient noise is not constant, because the user may slightly move its phone away from the tag, etc.). This increased power level may be the initial maximum or "standard" level or may be any level between the level at which the said another application answered and the initial maximum or "standard" level used to continuously search for phones.

Figure 7:
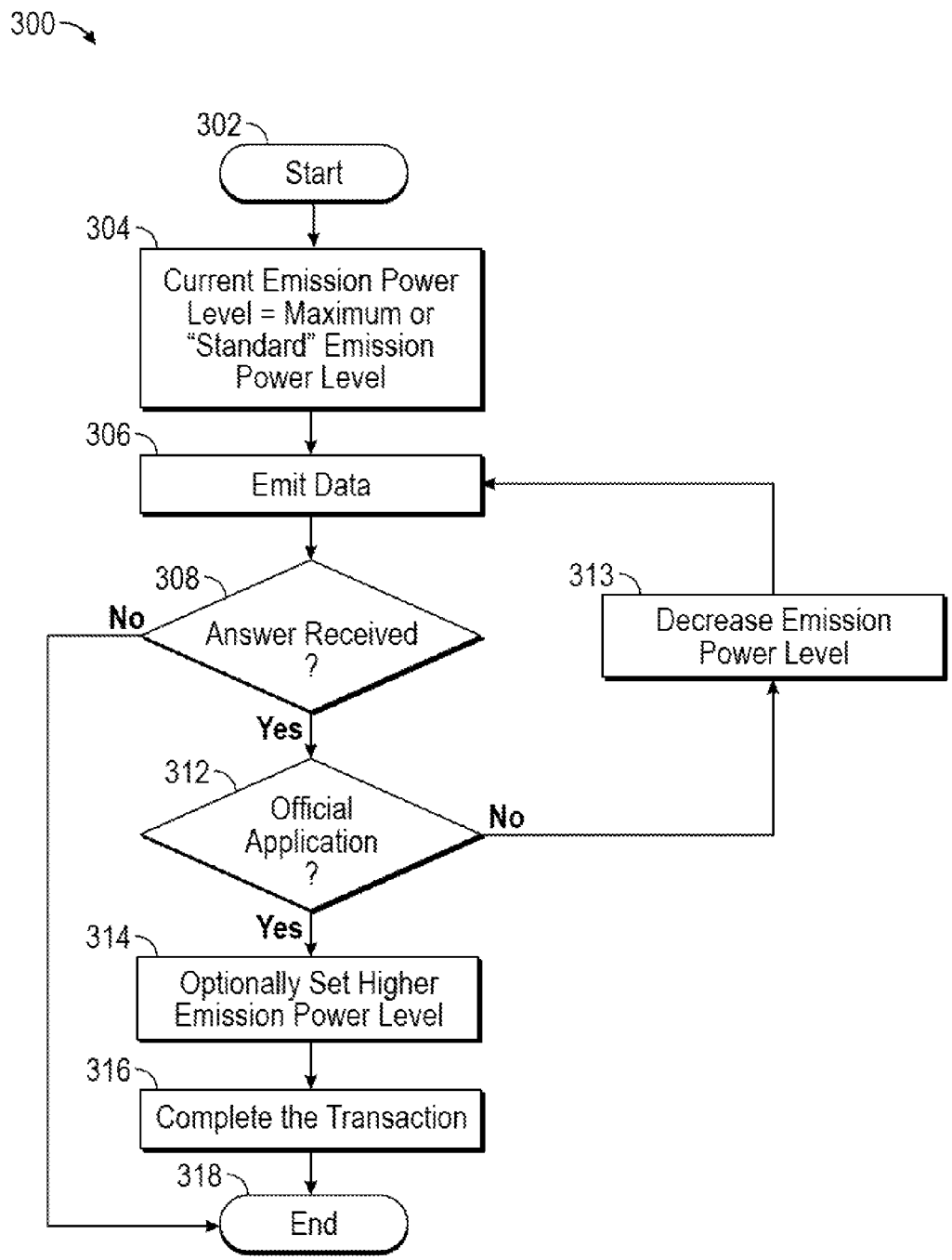
FIG. 7 illustrates a flow chart of operations depicting logical operational steps of a decreasing ramp algorithm, in accordance with an example embodiment.

FIG. 7 illustrates a flow chart of operations depicting logical operational steps of a decreasing ramp algorithm 300, in accordance with an example embodiment. The algorithm (or method) 300 includes a number of logical operational steps, examples of which are shown in FIG. 7. As indicated at block 302 in FIG. 7, the process begins. Next, as shown at block 304, a step or logical operation can be implemented in which the Current emission power level=maximum or "standard" emission power level. Then, as depicted at block 306, data can be emitted from, for example, tag 10 discussed previously.

Thereafter, as illustrated at decision block 308, a test is performed to determine if an answer is received. If not, the process terminates as shown at block 318. If an answer is received (i.e., "Yes"), as shown next at decision block 312, a test can be performed to determine if the received answer is associated with an official application. If not, then the emission power level is decreased, as shown at block 313 followed by processing of the operation shown at block 306 ("Emit data") and so on.

Assuming that an official application is detected, as indicated at decision block 312, an operation can be performed as shown at block 314 to optionally set a higher emission power level. The transaction is then completed as shown at block 316 and the process then ends, as indicated at block 318. The algorithm 300 shown in FIG. 7 thus provides for a decreasing ramp algorithm such as the previously discussed decreasing ramp algorithm associated with the decreasing ramp module 6.

Figure 8A:
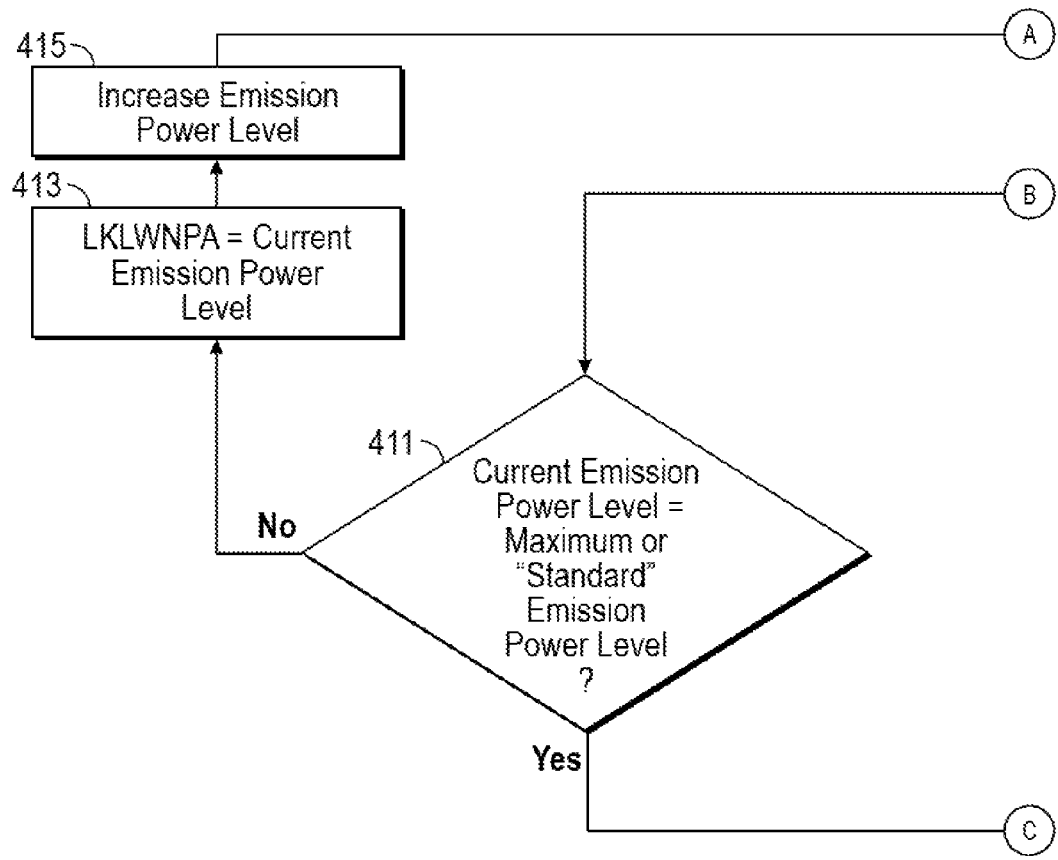
FIGS. 8A-8B illustrate a flow chart of operations depicting logical operational steps of a dichotomy algorithm, in accordance with an example embodiment.
Figure 8B:
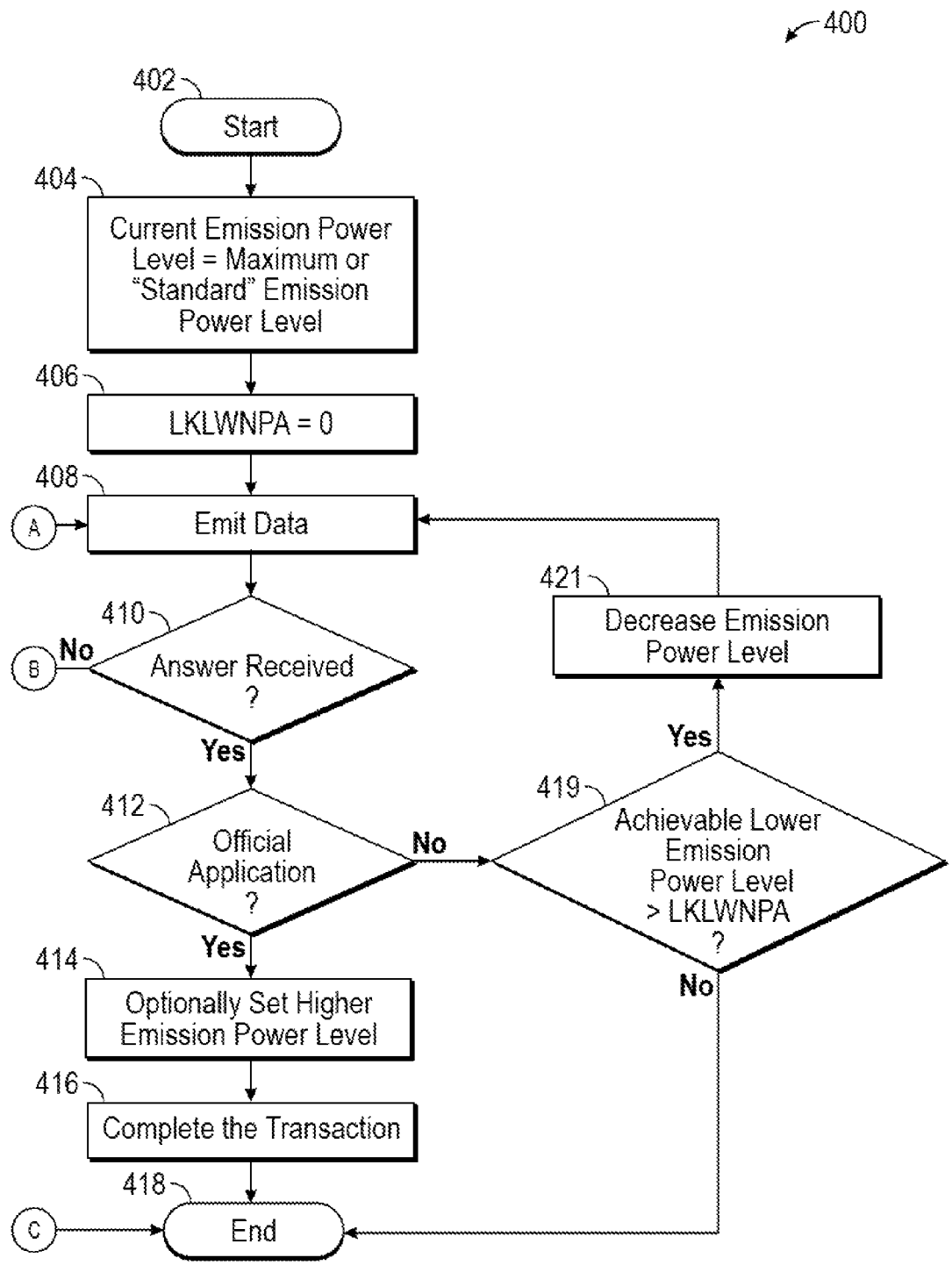

FIGS. 8A-8B illustrate a flow chart of operations depicting logical operational steps of a dichotomy algorithm 400, in accordance with an example embodiment. As indicated at block 402, the process begins. The algorithm (or method) 400 includes a number of logical operational steps, examples of which are shown in FIGS. 8A-8B. Thereafter, as depicted at block 404, a step or logical operation can be implemented in which the Current emission power level=maximum or "standard" emission power level. Next, as shown at block 406, a step or logical operation can be implemented in which LKLWNPA (Last Known Level Where No Phone Answers)=0. Note that this feature is helpful in case the official application can only be detected with the minimum possible emission power level. In this case, the algorithm will reduce several times the emission power level, down to this successful minimum where the non-official application will not answer.

Then, as described at block 408, a step or operation can be implemented in which data is emitted from, for example, the tag 10 discussed previously. Next, as shown at decision block 410, a test is performed to determine if an answer is received. If so, then as shown at block 412, a test is performed to determine if the received answer is associated with an official application. If the answer is "Yes," then a step or operation can be implemented as shown at block 414 to optionally set a higher emission power level. The transaction is then completed, as indicated at block 416 and the process then terminates, as shown at block 418.

Returning now to the decision block 410, assuming it is determined that an answer was not received (i.e., "No" with respect to decision block 410), then as shown at decision block 411, a test can be implemented to determine if the Current emission power level=maximum or "standard" emission power level. If the answer is "Yes," then the process then terminates as shown at block 418. If the answer, however, is "No," then the operation shown at block 413 is processed wherein LKLWNPA=current emission power level, followed by the operation depicted at block 415 in which the emission power level is increased. Following completion of the operation shown at block 415, the "Emit data" operation depicted at block 408 is implemented and so on.

Returning now to the operation shown at decision block 412 ("Official application?"), assuming the answer is "No," then an operation can be processed as depicted at decision block 419 to determine if there is an Achievable lower emission power level>LKLWNPA (or, if there is a power level both lower than the current emission power level and higher than LKLWNPA). If not, then the process ends as shown at block 418. Otherwise, as indicated at block 421, the emission power level is decreased, followed by the operation shown at block 408 ("Emit data") and so on.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for managing emission of data from a tag, said method comprising:
   emitting data from a tag via RF communications;
   detecting a non-official application running on a first mobile device, wherein said non-official application comprises an unauthorized application and an official application comprises an authorized application; and
   varying an emission power level for said emitting of said data from said tag via said RF communications until an answer is received from an official application running on another mobile device so as to prevent said first mobile device running said non-official application from preventing said official application running on said another mobile device from initiating or completing a transaction with respect to said data emitted from said tag via said RF communications.

2. The method of claim 1 wherein said RF communications comprises BLE (Bluetooth Low Energy) communications and wherein said tag comprises a BLE enabled tag that includes a processor, a memory, and a transceiver, wherein said processor communicates with said memory and said transceiver and wherein said processor includes a random number generator to facilitate secure communications and wherein said secure communications further include symmetric cryptography or asymmetric cryptography.

3. The method of claim 1 wherein varying said emission power level further comprises: varying said emission power level with a decreasing ramp algorithm.

4. The method of claim 3 wherein said decreasing ramp, algorithm decreases said emission power level from a maximum level or a standard level to a level where said first mobile device does not answer anymore with respect to said data emitted by said tag.

5. The method of claim 1 wherein varying said emission power level further comprises: varying said emission power level with a dichotomy algorithm.

6. The method of claim 5 wherein said dichotomy algorithm sets said emission power level to a value between a last known level where said first mobile, device still answers with respect to said data and a last known level where no mobile device answers.

7. The method of claim 2 wherein said varying said emission power level further comprises varying said emission power level transmitted through said transceiver associated with said tag.

8. An apparatus for managing emission of data from a tag, said apparatus comprising:
   a tag that emits data from said tag via RF communications, wherein if a non-official application is running on a first mobile device, wherein said non-official application comprises an unauthorized application and an official application comprises an authorized application, and wherein an emission power level for said emitting of said data from said tag via said RF communications is varied until an answer is received from an official application running on another mobile device so as to prevent said first mobile device running said non-official application from preventing said official application running on said another mobile device from initiating or completing a transaction with respect to said data emitted from said tag via said RF communications.

9. The apparatus of claim 8 wherein said RF communications comprises BLE (Bluetooth Low Energy) communications and wherein said tag comprises a BLE enabled tag that includes a processor, a memory, and a transceiver, wherein said processor communicates with said memory and said transceiver and wherein said processor includes a random number generator to facilitate secure communications.

10. The apparatus of claim 8 wherein said emission power level is varied with a decreasing ramp algorithm.

11. The apparatus of claim 10 wherein said decreasing ramp algorithm decreases said emission power level from a maximum level or a standard level to a level where said first mobile device does not answer anymore with respect to said data emitted by said tag.

12. The apparatus of claim 8 wherein said emission power level is varied with a dichotomy algorithm.

13. The apparatus of claim 12 wherein said dichotomy algorithm sets said emission power level to a value between a last known level where said first mobile device still answers with respect to said data and a last known level where no mobile device answers.

14. The apparatus of claim 9 wherein said varying said emission power level further comprises varying said emission power level transmitted through said transceiver associated with said tag.

15. A system for managing emission of data from a tag, said system comprising:
- at least one processor; and
- a non-transitory computer-usable medium embodying computer program code, said computer-usable medium capable of communicating with said at least one processor, said computer program code comprising instructions executable by said at least one processor and configured for:
- emitting data from a tag via RF communications;
- detecting a non-official application running on a first mobile device, wherein said non-official application comprises an unauthorized application and an official application comprises an authorized application; and
- varying an emission power level for said emitting of said data from said tag via said RF communications until an answer is received from an official application running on another mobile device so as to prevent said first mobile device running said non-official application from preventing said official application running on said another mobile device from initiating or completing a transaction with respect to said data emitted from said tag via said RF communications.

16. The system of claim 15 wherein said RF communications comprises BLE (Bluetooth Low Energy) communications and wherein said tag comprises a BLE enabled tag that includes a processor, a memory, and a transceiver, wherein said processor communicates with said memory and said transceiver and wherein secure communications facilitated by said tag include symmetric cryptography and asymmetric cryptography.

17. The system of claim 15 wherein said instructions for varying said emission power level further comprise instructions for varying said emission power level with a decreasing ramp algorithm.

18. The system of claim 17 wherein said decreasing ramp algorithm decreases said emission power level from a maximum level or a standard level to a level where said first mobile device does not answer anymore with respect to said data emitted by said tag.

19. The system of claim 15 wherein said instructions for varying said emission power level further comprise instructions for varying said emission power level with a dichotomy algorithm.

20. The system of claim 19 wherein said dichotomy algorithm sets said emission power level to a value between a last known level where said first mobile device still answers with respect to said data and a last known level where no mobile device answers.

* * * * *